US010279480B1

(12) United States Patent
Holson et al.

(10) Patent No.: US 10,279,480 B1
(45) Date of Patent: May 7, 2019

(54) SENSOR FUSION

(71) Applicant: X Development LLC, Mountain View, CA (US)

(72) Inventors: Benjamin Holson, Sunnyvale, CA (US); Jeffrey Bingham, San Francisco, CA (US); Ben Berkowitz, San Francisco, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 179 days.

(21) Appl. No.: 15/331,423

(22) Filed: Oct. 21, 2016

(51) Int. Cl.
| *G06F 19/00* | (2018.01) |
| *B25J 9/16* | (2006.01) |
| *G01C 9/00* | (2006.01) |
| *B25J 5/00* | (2006.01) |

(52) U.S. Cl.
CPC ............. *B25J 9/1694* (2013.01); *B25J 5/007* (2013.01); *B25J 9/162* (2013.01); *G01C 9/00* (2013.01)

(58) Field of Classification Search
CPC .......... B25J 9/1694; B25J 5/007; B25J 9/162; G01C 9/00
USPC .................................................. 700/245, 258
See application file for complete search history.

(56) References Cited

U.S. PATENT DOCUMENTS

| 7,689,321 B2 | 3/2010 | Karlsson | |
| 8,498,827 B2 | 7/2013 | Yost | |
| 8,897,920 B2 * | 11/2014 | Wang | B25J 5/00 700/264 |
| 8,935,006 B2 * | 1/2015 | Vu | B25J 5/007 700/264 |
| 9,283,674 B2 * | 3/2016 | Hoffman | B25J 9/161 |
| 9,434,558 B2 * | 9/2016 | Criswell | B25J 5/007 |
| 9,844,882 B2 * | 12/2017 | Takizawa | B25J 9/1694 |
| 9,873,200 B2 * | 1/2018 | Song | B25J 11/001 |
| 9,956,687 B2 * | 5/2018 | Florencio | B25J 9/1694 |
| 9,987,746 B2 * | 6/2018 | Bradski | B25J 9/163 |
| 2012/0277901 A1 | 11/2012 | Jacobsen et al. | |
| 2014/0365003 A1 * | 12/2014 | Takahashi | B25J 5/007 700/245 |
| 2015/0202770 A1 * | 7/2015 | Patron | G05D 1/024 700/245 |
| 2015/0336264 A1 * | 11/2015 | Berger | B25J 5/007 180/21 |
| 2015/0336272 A1 * | 11/2015 | Drew | B25J 9/1687 156/64 |
| 2017/0030134 A1 * | 2/2017 | Elie | E05F 15/71 |

OTHER PUBLICATIONS

Ooi, R. C. (2003). Balancing a Two-Wheeled Autonomous Robot, The University of Western Australia School of Mechanical Engineering. Final Year Thesis. 72 pages.

(Continued)

*Primary Examiner* — Ronnie M Mancho
(74) *Attorney, Agent, or Firm* — Middleton Reutlinger

(57) ABSTRACT

Methods, apparatus, and computer readable media applicable to robots, such as balancing robots. Some implementations are directed to determining multiple measures of a property of a robot for a given time and determining a final measure of the property of the robot for the given time based on the multiple measures. One or more control commands may be generated based on the final measure of the property and provided to one or more actuators of the robot.

20 Claims, 4 Drawing Sheets

(56) References Cited

OTHER PUBLICATIONS

Li, et al. (2012). Dynamic Balance Control for Biped Robot Walking Using Sensor Fusion, Kalman Filter, and Fuzzy Logic. IEEE Transactions on Industrial Electronics, 59(11), pp. 4394-4408.

* cited by examiner

SENSOR FUSION

BACKGROUND

Balancing robots have a statically unstable balancing base that may take various forms, such as a balancing base that includes two axially-aligned wheels (e.g., as depicted in various figures herein), a balancing base that includes only a single wheel, or a balancing base that includes a spherical roller. Balancing robots are not statically stable and must be at least selectively actively balanced to remain upright. For example, in response to a disturbance to a balancing robot (e.g., force applied by the balancing robot and/or force applied to the balancing robot), one or more components of the robot may need to be adjusted to actively balance the robot and ensure it stays upright. In other words, in response to a disturbance, component(s) of the balancing robot are adjusted to thereby adjust the center of mass of the balancing robot so that the center of mass of the balancing robot is returned to a stabilized/balanced position (e.g., over a center point of a balancing base).

SUMMARY

This specification is directed generally to various techniques that are applicable to various robots (e.g., a balancing robot), and to robots that implement one or more of the various techniques. In some implementations, sensor data from a group of one or more sensors of a robot may be utilized to determine a measure of a property of the robot, even though the sensor data may not directly indicate the property. For example, a pitch angle of a balancing base of a balancing robot may be determined based on: position and/or velocity sensor data for each of a plurality of actuators of the robot, such as actuators that control the balancing base and/or a robot arm of the balancing robot. Even though the position and/or velocity sensor data does not directly indicate the pitch angle, it may be utilized to determine a current configuration of the balancing robot, which may then be utilized to determine the pitch angle (e.g., based on a dynamic model of the balancing robot).

In some implementations, determining the measure for a property of a robot based on "indirect sensor data" may obviate the need for the robot to have a separate sensor that directly measures the property. For example, where a pitch angle is determined based on "indirect sensor data", the robot may optionally omit an inclinometer or any other sensor that directly measures the pitch angle.

In some implementations, determining the measure for a property of a robot based on "indirect sensor data" may enable both that measure and a directly determined measure to be utilized in determining a final measure to be utilized for the property. For example, where a pitch angle is determined based on "indirect sensor data" and an additional pitch angle is determined directly based on an inclinometer, a final pitch angle to be used may be based on both the pitch angle and the additional pitch angle. For example, an average (optionally weighted) and/or other statistical combination of the pitch angles may be utilized and/or the pitch angle may be utilized as a check to make sure the additional pitch angle is reasonable (e.g., as a check to ensure the inclinometer hasn't failed) before using the additional pitch angle to control one or more components of the robot.

In some implementations, multiple measures for a property of a robot may be determined based on indirect sensor data, and the multiple measures used (optionally in combination with directly determined measure(s) for the property) in determining a final measure of the property. For example, first indirect sensor data from a first group of one or more sensors may be utilized to determine a first measure for the property, second indirect sensor data from a second group of one or more sensors (that includes one or more sensors that vary from the first group of sensors) may be utilized to determine a second measure for the property, and third direct sensor data from a sensor that directly measures the property may be utilized to determine a third measure for the property. A final measure for the property may be determined based on all three measures. For example, an average (optionally weighted) and/or other statistical combination of the three measures may be utilized and/or one or more of the measures may be utilized as a check to make sure other measure(s) are reasonable (e.g., as a check to ensure the inclinometer hasn't failed) before using the other measures to determine the final measure.

In some implementations, determining a measure for a property of a robot based on indirect sensor data may include determining a solution for an unknown variable in one or more models of the robot based on values for known variables that are determined using the indirect sensor data. Various models of the robot may be utilized. For example, for a balancing robot one or more models may be used that take into account gravity and the self-balancing nature of the balancing robot (e.g., that assume the robot is in a stable or semi-stable state).

In some implementations, available sensor data and the available model(s) of the robot may enable multiple measures of a property of a robot to be determined, each time using sensor data from a unique group of one or more sensors and/or using a unique model of the available model(s). For example, a first measure may be determined based on sensor data from only sensor A, a second measure may be determined based on sensor data from only sensors B-G, a third measure may be determined based on sensor data from only sensors C-H, a fourth measure may be determined based on sensor data from sensors B and D-H, etc.

In some implementations, measure(s) of one or more properties for a robot that are determined according to implementations described herein may be iteratively determined during operation of the robot and used in generating control commands that are provided to one or more actuators of the robot (e.g., balancing base actuators and/or arm actuators). For example, a final measure for each of one or more properties for a balancing robot may be determined at each iteration of a control loop, and used in generating control commands that are provided for maintaining stability of the balancing robot and/or provided for other action(s) of the balancing robot.

In some implementations, a method is provided that includes determining a first measure of a property of the robot for a first time. Determining the first measure is based on first sensor data from a first group of sensors of the robot. The first group of the sensors includes at least a given sensor of the sensors of the robot. The first sensor data for the given sensor directly indicates a known value, for a given variable, that is utilized in determining the first measure. The method further includes determining a second measure of the property of the robot for the first time. Determining the second measure is based on second sensor data from a second group of the sensors of the robot. The second group of the sensors excludes the given sensor and includes at least one additional sensor that is not included in the first group. No known value for the given variable is directly indicated by the second sensor data and no known value for the given variable is utilized in determining the second measure. The method further includes: determining a final measure of the property of the robot for the first time based on the first measure and the second measure; generating one or more control commands based on the final measure of the property; and providing the one or more control commands to one or more actuators of the robot.

This method and other implementations of technology disclosed herein may each optionally include one or more of the following features.

In some implementations, the second group of the sensors includes a plurality of the sensors.

In some implementations, the first group of the sensors consists of the given sensor, and determining the first measure includes using the known value as the first measure. In some of those implementations, the second group of the sensors includes a plurality of the sensors and determining the second measure includes solving for the given variable based on application of the second sensor data to a model that is applicable to the robot.

In some implementations, determining the final measure includes averaging the first measure and the second measure.

In some implementations, the method further includes determining a third measure of the property of the robot for the first time. Determining the third measure is based on third sensor data from a third group of the sensors of the balancing robot, the third group of the sensors excludes the given sensor and excludes the additional sensor, and no known value for the given variable is directly indicated by the third sensor data and no known value for the given variable is utilized in determining the third measure. In some of those implementations, determining the final measure of the property of the robot for the first time is further based on the third measure.

In some implementations, the robot is a balancing robot and the property of the robot for the first time is a pitch angle of the balancing robot. In some of those implementations, the first group of the sensors consists of an inclinometer and determining the first measure may include using the known value as the first measure. In some versions of the implementations where the first group of the sensors consists of the inclinometer, the second group of the sensors include a plurality of sensors that include an inertial measurement unit and/or one or more actuator sensors that each measure an actuator property of a corresponding actuator.

In some implementations, a method is provided that includes determining a first measure of a property of a balancing robot for a first time. Determining the first measure includes determining a solution for an unknown variable and using the solution as the first measure. Determining the solution is based on first sensor data from a first group of sensors of the balancing robot, the first group of the sensors includes at least a given sensor of the sensors of the balancing robot, and the first sensor data does not directly indicate the solution for the unknown variable. The method further includes determining a second measure of the property of the balancing robot for the first time. Determining the second measure includes determining an additional solution for the unknown variable and using the additional solution as the second measure. Determining the additional solution is based on second sensor data from a second group of the sensors of the balancing robot. The second group of the sensors excludes the given sensor and includes at least one additional sensor that is not included in the first group, and the second sensor data does not directly indicate the additional solution for the unknown variable. The method further includes: determining a final measure of the property of the balancing robot for the first time based on the first measure and the second measure; generating one or more control commands based on the final measure of the property; and providing the one or more control commands to one or more actuators of the balancing robot.

This method and other implementations of technology disclosed herein may each optionally include one or more of the following features.

In some implementations, the first group and the second group each include a plurality of the sensors.

In some implementations, the sensors of the balancing robot do not include any sensors that directly measure the property of the balancing robot. In some of those implementations, the property of the balancing robot is a force applied by an end effector of the balancing robot.

In some implementations, determining the solution for the unknown variable includes determining the solution based on application of the first sensor data to a dynamic model of the balancing robot.

In some implementations, the method further includes determining a third measure of the property based on a particular sensor of the sensors that directly measure the property of the balancing robot. The particular sensor is not included in the first group and is not included in the second group. In some of those implementations, determining the final measure is further based on the third measure. In some versions of those implementations, determining the final measure may include using the third measure as the final measure when comparison of the third measure to the first measure and the second measure satisfies one or more criteria. In some other version of those implementations, determining the final measure may include determining the final measure based on a statistical combination of the first measure, the second measure, and the third measure.

In some implementations a robot is provided that includes a plurality of actuators and a plurality of sensors. The robot lacks any sensor that directly measures a particular property of the balancing robot. The robot further includes one or more processors receiving sensor data from the sensors. The one or more processors are to: determine a first measure of the particular property of the balancing robot for a first time, where determining the first measure includes determining a solution for an unknown variable and using the solution as the first measure, and where determining the solution is based on first sensor data from a first group of the sensors of the balancing robot. The one or more processors are further to: determine a second measure of the particular property of the balancing robot for the first time, where determining the second measure includes determining an additional solution for the unknown variable and using the additional solution as the second measure, and where determining the additional solution is based on second sensor data from a second group of the sensors of the balancing robot. The one or more processors are further to: determine a final measure of the property of the balancing robot for the first time based on the first measure and the second measure; generate one or more control commands based on the final measure of the property; and provide the one or more control commands to one or more of the actuators of the balancing robot.

Other implementations may include a non-transitory computer readable storage medium storing instructions executable by at least one processor (e.g., a central processing unit (CPU) and/or graphics processing unit (GPU)) to perform a method such as one or more of the methods described above. Yet another implementation may include a system of one or more computers and/or one or more robots that include one or more processors operable to execute stored instructions to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
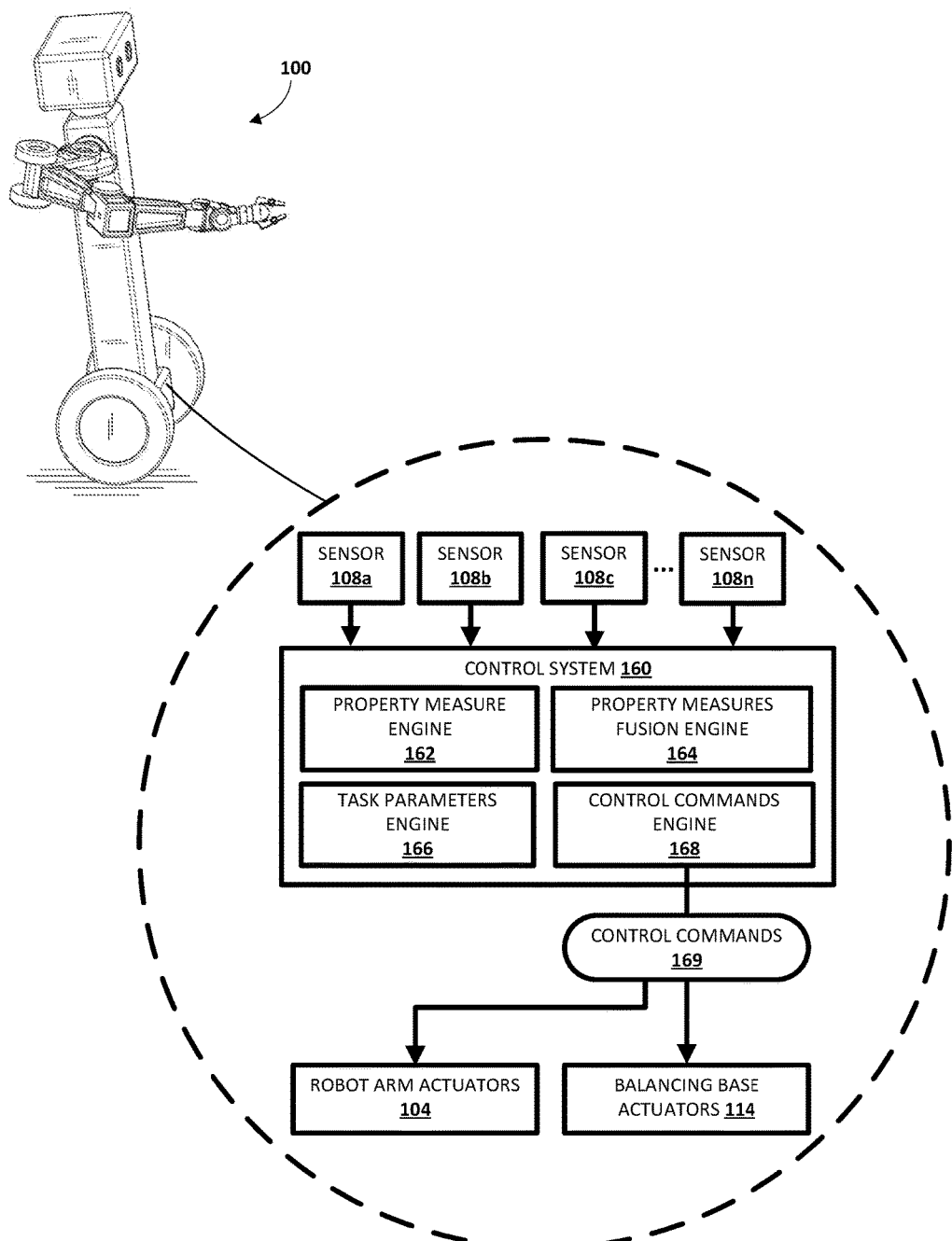
FIG. 1 illustrates an example balancing robot and example components of the balancing robot via which implementations disclosed herein may be implemented.
Figure 2:
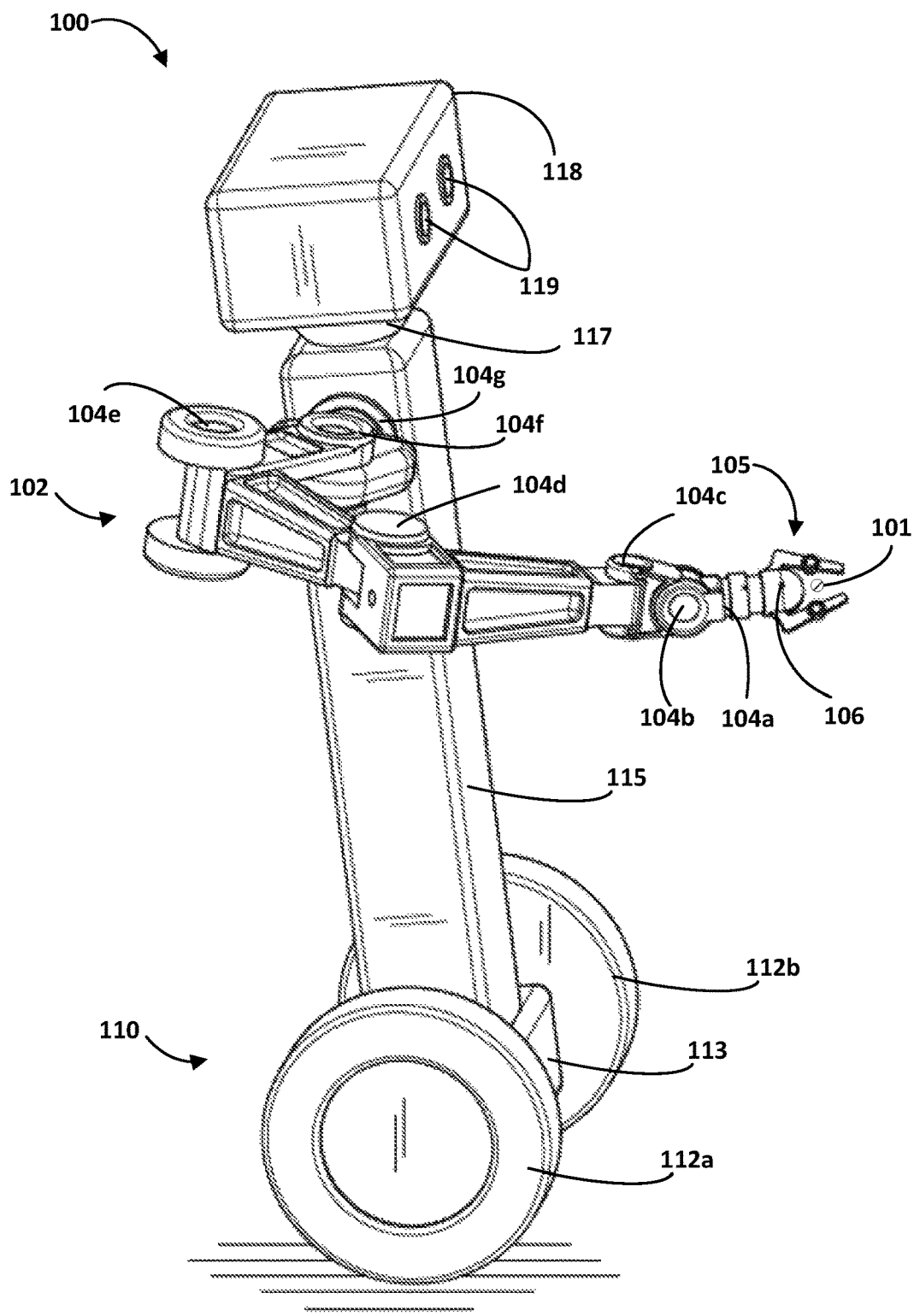
FIG. 2 illustrates the example balancing robot of FIG. 1 in additional detail.

FIGS. 1 and 2 illustrate an example balancing robot 100. The balancing robot 100 is illustrated with detailed numbering in FIG. 2, but detailed numbering is omitted in FIG. 1 for the sake of simplicity. With initial reference to FIG. 2, the balancing robot 100 includes a balancing base 110, a torso 115 that extends upward from the balancing base 110, a robot arm 102 coupled to the torso 115, and a head 118 that is adjustably coupled to the torso 115 via a ball and socket type joint 117.

The balancing base 110 includes two axially aligned wheels 112a and 112b and an intermediary member 113 that extends between the wheels 112a, 112b and that supports the torso 115. The head 118 includes a stereographic camera 119. The head 118 may be adjustable via the joint 117 to correspondingly adjust the pose of the stereographic camera 119. For example, the head 118 may be actively adjusted (e.g., via one or more actuators) up/down in correspondence with detected changes to the angle of the torso 115 relative to a horizontal plane. This may be beneficial to enable certain objects and/or areas to be maintained in the field of view of the stereographic camera 119 despite changes to the angle of the torso 115 relative to the horizontal plane, such as pendulum like movements of the torso 115 that may occur during active balancing of the balancing robot 100.

The robot arm 102 includes a plurality of actuators that are referenced in FIG. 4A with references 104a-g. As used herein, an "actuator" of a robot may refer to motors (e.g., servo motors), joints, shafts, gear trains, pumps (e.g., air or liquid), pistons, drives, and/or other components that may create and/or undergo propulsion, rotation, and/or motion. An actuator may optionally have an associated driver that receives control commands for driving the actuator and converts those control commands into one or more signals for driving the actuator. In some implementations, each of the actuators 104a-g may be a servo motor that enables controllable rotation, about a respective axis, in a first direction and/or a second direction. It is understood that the actual "actuators" are "under" the exterior surfaces of balancing robot 100 indicated by references 104a-g.

Each of the actuators 104a-g provides a degree of freedom of movement for the balancing robot 100. The configuration of the actuators 104a-g dictates a robot arm pose of the robot arm 102 relative to a fixed reference point of the robot of the balancing robot 100. The robot arm pose of the robot arm 102 relative to a world frame is dictated by the configuration of the actuators 104a-g and by a balancing base pose of the balancing base 110 (i.e., since the pose of the connection point of the robot arm 102 to the torso 115 is dependent on the balancing base pose).

An end effector 105 is at a terminal end of the robot arm 102. In the figures herein, end effector 105 takes the form of a claw with two opposing "fingers" or "digits." The claw is one type of "gripper" known as an "impactive" gripper. In some implementations, end effector 105 may be removable, and various types of modular end effectors may be installed onto balancing robot 100, depending on the circumstances. The end effector pose of the end effector 105 relative to a fixed reference point of the robot of the balancing robot 100 is dictated by the robot arm pose of the robot arm 102. The end effector pose of the end effector 105 relative to a world frame is dictated by the robot arm pose and by the balancing base pose of the balancing base 110.

The actuators 104a-g enable the end effector 105 to be positioned at any one of a plurality of achievable end effector poses and enable the end effector 105 to be in any one of a plurality of achievable motion states. In some implementations, the robot arm 102 has kinematic redundancy, meaning that a given end effector pose of the end effector 105 relative to a fixed reference point of the balancing robot 100 may be achieved through any one of multiple distinct robot arm poses of the robot arm 102. In some implementations, the end effector pose of the end effector 105 may be defined by a three-dimensional position coordinate of a reference point of the end effector 105, such as reference point 106. In some implementations, the reference point of an end effector may be a center of mass of the end effector, and/or a point near where end effector attaches to other components of the robot, though this is not required.

Although a particular balancing robot 100 is illustrated in FIGS. 1 and 2, various techniques described herein may be utilized with other robots having one or more alternative or additional features. For example, various techniques described herein may be utilized with non-balancing robots (e.g., robots having three or more wheels), non-mobile robots, unmanned aerial vehicles (UAVs), etc. Also, for example, no robot arm may be provided, more than one robot arm may be provided, robot arm(s) may be provided that that have more or fewer actuators than robot arm 102, and/or robot arms may be attached to structure that differs from torso 115. Also, for example, balancing base 110 may include more or fewer wheels (e.g., only a single wheel), wheels that differ from wheels 112a, 112b (e.g., mercanum wheels), or may include alternative locomotive structure in lieu of wheels (e.g., one or more controllable omnidirectional spherical rollers). As another example, additional or alternative vision sensors may be included (e.g., an alternative stereographic camera, a monographic camera, LIDAR sensor(s)), and/or vision sensors may be alternatively mounted (e.g., on a gimbal that automatically maintains the vision sensor aligned in a horizontal plane). As yet another example, different end effector(s) may be provided such as different types of gripper(s) (e.g., "ingressive", "astrictive", and/or "contigutive"), or other types of tools such as drills, brushes, cutting tools, deburring tools, welding torches, and so forth.

Referring now to FIG. 1, the example balancing robot 100 and further example components of the balancing robot 100 are illustrated. The further components include a plurality of sensors 108a-n, a control system 160, robot arm actuators 104, and balancing base actuators 114. The robot arm actuators 104 collectively reference the actuators 104a-g that are referenced in FIG. 2 and that are described in more detail above and elsewhere herein. The balancing base actuators 114 drive and control the wheels 112a, 112b. For example, a first balancing base actuator may control the wheel 112a and a second balancing base actuator may control the wheel 112b.

The sensors 108a-n may include a variety of sensors. For example, the sensors 108a-n may include one or more of: sensors for each of the actuators 104 of the robot arm 102 (e.g., positional sensors); sensors coupled to the balancing base actuators 114 and/or the wheels 112a, 112b (e.g., encoders); an inertial measurement unit (IMU) (e.g., in the balancing base 110 and/or the torso 115); an inclinometer (e.g., in the balancing base 110 and/or the torso 115); and/or a force-torque sensor coupled to the end effector 105 (e.g., at or near actuator 104a to measure force applied to/by the end effector 105).

The control system 160 may be implemented by one or more processors, such as a CPU, GPU, and/or other controller(s) of the balancing robot 100. For example, one or more processors may execute instructions stored in associated memory to implement one or more aspects of the control system 160. In various implementations, the control system 160 may include a property measure engine 162, a property measures fusion engine 164, a task parameters engine 166, and a control commands engine 168. In some implementations, one or more of engines 162, 164, 166, and/or 168 may be omitted, combined, and/or implemented in a component that is separate from control system 160. For example, engine 166, or any operative portion thereof, may be implemented in a component that is executed by a separate system, such as a separate system that is remote from balancing robot 100.

The property measure engine 162 determines one or more measures for each of one or more properties of the balancing robot 100. Each of the measures determined by the property measure engine 162 is based on sensor data from a respective group of one or more of the sensors 108a-n.

In some implementations, the property measure engine 162 determines one or more measures of a property of the balancing robot 100 based on indirect sensor data that does not directly indicate the property. For example, a measure of a pitch angle of the balancing base 110 of the balancing robot 100 may be determined based on: position and/or velocity sensor data for each of a plurality of actuators of the balancing robot 100, such as the robot arm actuators 104 and/or the balancing base actuators 114. Even though the position and/or velocity sensor data does not directly indicate the pitch angle, the property measure engine 162 may utilize such sensor data to determine a current configuration of the robot, and then utilize the current configuration to determine the pitch angle. For instance, the property measure engine 162 may determine the pitch angle based on application of the current configuration to a dynamic model of the balancing robot 100.

In some implementations, the property measure engine 162 additionally or alternatively determines measure(s) of a property of the balancing robot 100 based on direct sensor data from sensor(s) that directly measure the property. For example, the engine 162 may determine a measure of a pitch angle of the balancing base 110 based on sensor data from an inclinometer of the balancing robot 100.

In some implementations, the property measure engine 162 determines multiple measures for a property of the balancing robot 100. For example, the engine 162 may utilize first indirect sensor data from a first group of one or more of the sensors 108a-n to determine a first measure for the property, second indirect sensor data from a second group of one or more of the sensors 108a-n (that includes one or more sensors that vary from the first group of sensors) to determine a second measure for the property, and third direct sensor data from one of the sensors 108a-n that directly measures the property to determine a third measure for the property.

In some implementations, to determine a measure for a property of the balancing robot 100 based on indirect sensor data, the property measure engine 162 determines a solution for an unknown variable in one or more models of the robot based on values for known variables that are determined using the indirect sensor data—and determines the measure for the property based on the solution for the unknown variable (e.g., uses the solution as the measure). Various models of the balancing robot 100 may be utilized, such as models that take into account gravity and the self-balancing nature of the balancing robot 100 (e.g., that assume the balancing robot 100 is in a stable or semi-stable state). In some implementations, using models that take into account gravity and/or that assume the robot is in a stable or semi-stable state may enable certain values in the models to be assumed as constants in determining a solution for an unknown variable (e.g., gravity values and/or values that are dependent on the balancing state of the balancing robot 100).

In some implementations, available sensor data and/or available model(s) (e.g., dynamic model(s), kinematic model(s)) of the balancing robot 100 may enable the property measure engine 162 to determine multiple measures of a property of the balancing robot 100, each time using sensor data from a unique group of one or more sensors and/or using a different available model. For example, the property measure engine 162 may determine a first measure based on sensor data from only sensor 108a, may determine a second measure based on sensor data from only sensors 108b and 108n, may determine a third measure based on sensor data from only sensors 108b and 108c, etc. Also, for example, the property measure engine 162 may determine a first measure based on applying sensor data from sensors 108a and 108b to a first model of the balancing robot 100, may determine a second measure based on applying sensor data from sensors 108a and 108b to a second model of the balancing robot 100, determine a third measure based on applying sensor data from sensors 108b and 108c to the first model of the balancing robot 100, etc.

Some examples of the property measure engine 162 are described with respect to the engine 162 determining multiple measures for a single property in a given iteration. However, in many implementations the property measure engine 162 may determine, in a given iteration, one or more measures for each of multiple properties of the balancing robot 100. For example, in a given iteration the engine 162 may determine measures for multiple properties such as: measures for a pitch angle of the balancing robot 100; measures for a force applied by the end effector 105 of the balancing robot 100; measures for position, velocity, and/or acceleration for one or more components of the balancing robot 100; etc.

The property measures fusion engine 164 determines a final measure for a property of the balancing robot 100 based on multiple measures of that property determined by property measure engine 162. In some implementations, the property measures fusion engine 164 determines a final measure based on combining multiple measures of that property. For example, the property measures fusion engine 164 may determine a final measure for a property based on an average and/or other statistical combination of the multiple measures of that property.

Optionally, in determining a final measure based on combining multiple measures, the property measures fusion engine 164 may weight each of the measures based on one or more factors. For instance, in determining a final measure for a given property, measure(s) determined based on only direct sensor data for the given property (i.e., a measure determined based on direct sensor data that directly measures the given property) may be weighted more heavily than measures determined based on indirect sensor data (i.e., measure(s) determined based on indirect sensor data that does not directly measure the given property). Also, for instance, measures determined based on a first group of one or more sensors and/or a first model may be weighted more heavily than measures determined based on a second group of one or more sensors and/or a second model. The weighting assigned to a group of one or more sensors may be based on, for example, characteristic(s) of each of those sensors, such as sensor accuracy, sensor type, sensor calibration recency, etc. The weighting assigned to a model may be based on, for example, a heuristics based weighting assigned to that model. The weightings assigned to a group of sensors and/or a model may also optionally be dependent on the property being determined. For example, a first group of sensors may have a first weighting when determining a final measure for a first property but have a unique second weighting when determining a final measure for a unique second property.

In some implementations, the property measures fusion engine 164 determines a final measure based on comparing multiple measures of that property, without necessarily combining those measures. For example, the property measures engine 162 may determine a first measure of a property based on direct sensor data from a first sensor and may determine one or more additional measures of the property based on indirect sensor data from one or more groups of one or more additional sensors—and may only utilize the first measure if it satisfies a threshold relative to one or more of the additional measures. In other words, the property measures fusion engine 164 may utilize the additional measure(s) to verify the accuracy of the first measure, prior to providing the first measure to one or more additional engines (e.g., control commands engine 168) for utilization in performing one or more operations with the balancing robot 100. This may ensure the first sensor (on which the first measure is based) hasn't failed and/or isn't generating erroneous sensor data.

As another example, assume the property measure engine 162 directly and/or indirectly determines multiple measures of a property. The property measures fusion engine 164 may, prior to combining the measures, compare the measures to determine whether one or more of the multiple measures are potentially erroneous—and optionally "discard" one or more of the measures prior to combining if such measures are determined to be potentially erroneous. The property measure engine 162 may use one or more of various techniques to determine whether a given measure of multiple measures is potentially erroneous. For example, assume a first measure indicates a pitch angle of 5.0°, a second measure indicates a pitch angle of 5.1°, and a third measure indicates a pitch angle of 10.0°. Due to the third measure satisfying one or more thresholds, the property measures fusion engine 164 may discard the third measure and determine a final measure based on combining only the first measure and the second measure. The threshold(s) may include, for example: a threshold relative to the first measure and/or the second measure (e.g., has at least X variation relative to the first measure, the second measure, and/or a combination of the first and second measure); and/or a threshold relative to the first, second, and third measures (e.g., has at least X variation relative to an average or other combination of the first, second, and third measures)

In some implementations, the property measure engine 162 determines measure(s) for one or more properties based on only indirect sensor data and the property measures fusion engine 164 determines a final measure for each of the one or more properties based on the corresponding indirect sensor data based measure(s). In some of those implementations, the sensors 108a-n may not include any sensors that directly measure one or more of the properties. For example, the property measure engine 162 may determine, based on indirect sensor data, one or more indirect measures of a force being applied by the end effector 105; the property measures fusion engine 164 may determine a final measure of the force; and the sensors 108a-n may not include a force-torque sensor or other sensor that directly measures the force applied by the end effector 105.

The property measures fusion engine 164 provides, to the control commands engine 168, the determined final measure for each of one or more properties. In some implementations, the property measures fusion engine 164 iteratively determines a final measure for each of one or more properties and provides the final measure(s) to the control commands engine 168. For example, at each control cycle of the control system 160 (or other iteration), the property measure engine 162 may determine multiple measures for a given property based on current sensor data, the property measures fusion engine 164 may determine a final measure for the given property based on the multiple measures, and the final measure may be provided to control commands engine 168. The final measure at each iteration will be based on the current sensor data for that iteration.

The control commands engine 168 generates control commands 169 at each of a plurality of control cycles of control system 160, and provides the control commands 169 to robot arm actuators 104, balancing base actuators 114, and/or other component(s) of the balancing robot 100. The control commands 169 (if any) at each of the control cycles may comprise a set of one or more control commands that dictate, inter alia, the parameters of motion (if any) for each of one or more of the robot arm actuators 104 and/or the parameters of motion (if any) for each of one or more of the balancing base actuators 114.

The control commands 169 generated at a given control cycle may be based on one or more of the final measures generated by the property measures fusion engine 164. For example, the control commands engine 168 may generate control commands 169 that seek to actively balance the balancing robot 100 based on one or more final measures and optionally based on other considerations. In some implementations, the control commands engine 168 may generate the control commands 169 based additionally on task parameters provided by task parameters engine 166 (e.g., based on parameter(s) of a task to be performed).

Task parameters engine 166 may determine one or more task parameters that may influence the operation of the control commands engine 168. For example, the task parameters engine 166 may determine or receive (e.g., as input from a higher level motion planning system) task input that sets forth one or more end effector poses to be traversed by the end effector 105. The task parameters engine 166 may determine task parameters that cause the control commands engine 168 to generate, at each control cycle, corresponding control commands 169 that seek to traverse the end effector 105 through those poses. The control commands 169 may be based on one or more final measures provided by property measures fusion engine 164 (e.g., based on final measures of positions of the robot arm actuators 104). As yet another example, the task parameters engine 166 may determine the balancing robot 100 is to apply force to an environmental object and determine parameters that cause the control commands engine 168 to generate control commands 169 that cause the balancing robot 100 apply such force. Again, the control commands 169 may be based on one or more final measures provided by property measures fusion engine 164.

In some implementations, in response to receiving data that indicates a disturbance to the balancing base 110, the control commands engine 168 will actively intervene to iteratively generate control commands 169 that seek to balance the balancing robot 100. A disturbance to the balancing base 110 may be caused by various factors such as, for example, an external force applied to the balancing robot (e.g., a human contacting the balancing robot), a force applied by the balancing robot to an environmental object (e.g., the end effector 105 contacting the environmental object), purposeful movement of the robot arm 120 and/or the balancing base 110 (since those movements will introduce disturbance(s) to the balancing base 110), etc. In some of those implementations, the control commands engine 168 may determine the disturbance to the balancing base 110 based on one or more final measures determined by the property measures fusion engine 164 and/or may determine the control commands 169, that seek to actively balance, based on one or more final measures.

Figure 3:
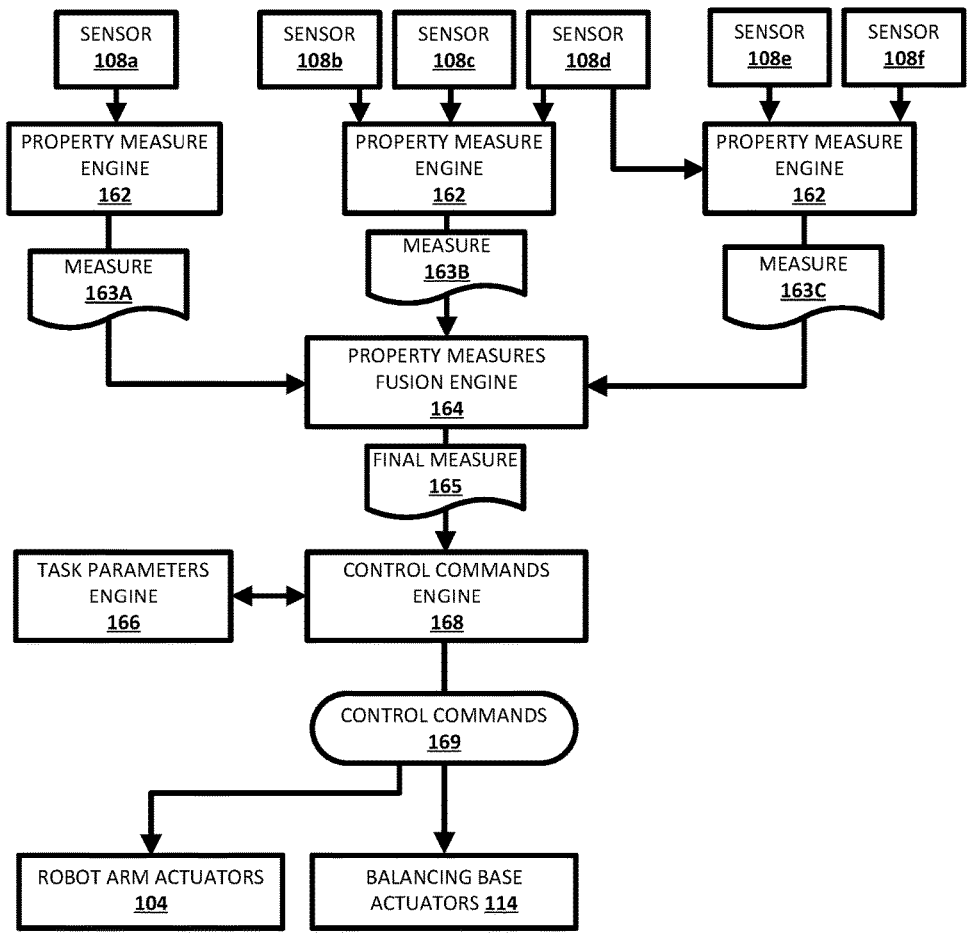
FIG. 3 illustrates an example of determining multiple measures for a property of a robot, determining a final measure for the property based on the multiple measures, and generating control command(s) based on the final measure.

FIG. 3 illustrates an example of determining multiple measures 163A, 163B, and 163C for a property of a robot, determining a final measure 165 for the property based on the multiple measures, and generating control command(s) 169 based on the final measure. In FIG. 3 multiple instances of property measure engine 162 are illustrated for ease of explanation. However, it is understood that in some implementations a single instance of the engine 162 may be provided and may generate the measures 163A, 163B, and 163C (in parallel and/or sequentially).

FIG. 3 illustrates one example of multiple measures 163A, 163B, and 163C that may be determined by property measure engine 162 in a given iteration (e.g., in a control cycle). The property measure engine 162 may optionally generate additional measures for additional properties in the given iteration.

Property measure engine 162 determines the measure 163A based on sensor data from sensor 108a. For example, the sensor data from sensor 108a may directly indicate the measure 163A. Property measure engine 162 determines the measure 163B based on sensor data from sensors 108b, 108c, and 108d. Property measure engine 162 determines the measure 163C based on sensor data from sensors 108d, 108e, and 108f. In some implementations, the property measure engine 162 may determine the measures 163B and 163C based on one or more models of the balancing robot 100.

The property measure engine 162 provides the measures 163A, 163B, and 163C to property measures fusion engine 164. The property measures fusion engine 164 determines a final measure 165 of the property based on the measures 163A, 163B, and 163C. For example, the property measures fusion engine 164 may determine the final measure 165 based on combining two or more of the measures 163A, 163B, and 163C and/or based on comparing two or more of the measures 163A, 163B, and 163C.

The control commands engine 168 generates control commands 169 based at least in part on the final measure 165 of the property. In some implementations, the control commands engine 168 generates the control commands 169 based on additional final measure(s) (for additional property/properties) determined by property measures fusion engine 164 and/or based on other sensor data. In some implementations, the control commands engine 168 additionally or alternatively generates the control commands 169 based on one or more task parameters provided by task parameters engine 166. The control commands engine 168 provides the control commands 169 to the robot arm actuators 104 and/or the balancing base actuators 114 (e.g., over one or more buses) to control the actuator(s) 104 and/or 114.

The determined measures 163A, 163B, and 163C may be for any one of various properties of the balancing robot 100. As some non-limiting examples, the measures 163A, 163B, and 163C may be for a property such as: a pitch angle of the balancing robot 100; a center of mass of the balancing robot 100; a pose of a component of the balancing robot 100 (e.g., the end effector 105, the robot arm 102, the balancing base 110); or position, velocity, and/or acceleration of actuators 104, actuators 114, and/or other components.

Figure 4:
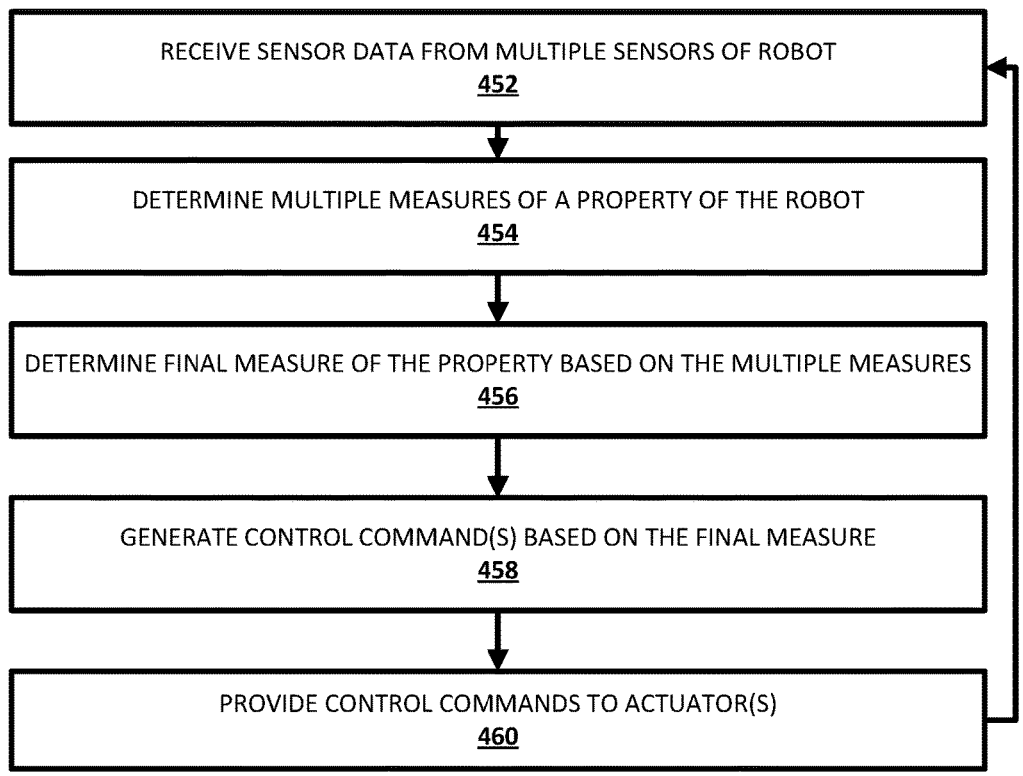
FIG. 4 is a flowchart illustrating an example method according to various implementations disclosed herein.

FIG. 4 is a flowchart illustrating an example method 400 according to various implementations disclosed herein. For convenience, the operations of the flow chart are described with reference to a system that performs the operations. This system may include, for example, one or more processors of a robot (e.g., balancing robot 100), such as one or more processors implementing all or aspects of control system 160. Moreover, while operations of method 400 are shown in a particular order, this is not meant to be limiting. One or more operations may be reordered, omitted or added.

At block 452, the system receives sensor data from multiple sensors of a robot.

At block 454, the system determines multiple measures of a property of the robot. In some implementations, the system determines each measure based on sensor data from a unique group of the multiple sensors. For example, the system may determine a first measure of the property based on sensor data from a first group of one or more of the sensors, may determine a second measure based on sensor data from a second group of one or more of the sensors, etc. In some implementations, the sensor data includes direct sensor data from a sensor that directly measures the property and the system determines a measure based on only the direct sensor data. In some implementations, the sensor data includes indirect sensor data from one or more sensors that do not directly measure the property and the system determines one or more measures based on the indirect sensor data. For example, the system may determine a measure based on determining a solution for an unknown variable in one or more models of the robot based on values for known variables that are determined using the indirect sensor data. The system may utilize various models of the robot, such as dynamic models, kinematic models, etc.

At block 456, the system determines a final measure of the property based on the multiple measures of block 454. In some implementations, the system determines a final measure based on combining multiple measures of the property.

For example, the system may determine a final measure for the property based on an average and/or other statistical combination of the multiple measures of that property. In some implementations, the system determines a final measure based on comparing multiple measures of that property, without necessarily combining those measures.

At block 458, the system generates one or more control commands based on the final measure of block 456.

At block 460, the system provides the control commands to one or more actuators of the robot.

The system then returns to block 452 and performs another iteration of method 400. Multiple iterations of method 400 will typically be performed at a relatively high frequency (e.g., an iteration at each control cycle) during operation of the robot. Method 400 is described with respect to a final measure being determined for a single property for the sake of simplicity. However, in many implementations multiple final measures may be determined for multiple measures in a given iteration based on the method 400. For example, at block 454, the system may determine multiple measures for each of multiple properties of the robot, at block 456 the system may determine a final measure for each of the properties based on respective measures of block 452, and at block 458 the system may generate one or more control commands based on the multiple determined final measures.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method performed by one or more processors of a robot, the method comprising:
    determining a first measure of a property of the robot for a first time,
        wherein determining the first measure is based on first sensor data from a first group of sensors of the robot,
        wherein the first group of the sensors includes at least a given sensor of the sensors of the robot, and
        wherein the first sensor data for the given sensor directly indicates a known value, for a given variable, that is utilized in determining the first measure;
    determining a second measure of the property of the robot for the first time,
        wherein determining the second measure is based on second sensor data from a second group of the sensors of the robot,
        wherein the second group of the sensors excludes the given sensor and includes at least one additional sensor that is not included in the first group, and
        wherein no known value for the given variable is directly indicated by the second sensor data and wherein no known value for the given variable is utilized in determining the second measure;
    determining a final measure of the property of the robot for the first time based on the first measure and the second measure;
    generating one or more control commands based on the final measure of the property; and
    providing the one or more control commands to one or more actuators of the robot to control the one or more actuators based on the one or more control commands.

2. The method of claim 1, wherein the second group of the sensors includes a plurality of the sensors.

3. The method of claim 1, wherein the first group of the sensors consists of the given sensor, and wherein determining the first measure comprises using the known value as the first measure.

4. The method of claim 3, wherein the second group of the sensors includes a plurality of the sensors.

5. The method of claim 4, wherein determining the second measure comprises solving for the given variable based on application of the second sensor data to a model that is applicable to the robot.

6. The method of claim 1, wherein determining the final measure comprises averaging the first measure and the second measure.

7. The method of claim 1, further comprising:
    determining a third measure of the property of the robot for the first time,
        wherein determining the third measure is based on third sensor data from a third group of the sensors of the robot,
        wherein the third group of the sensors excludes the given sensor and excludes the additional sensor, and
        wherein no known value for the given variable is directly indicated by the third sensor data and wherein no known value for the given variable is utilized in determining the third measure;
    wherein determining the final measure of the property of the robot for the first time is further based on the third measure.

8. The method of claim 1, wherein the robot is a balancing robot and wherein the property of the robot for the first time is a pitch angle of the balancing robot.

9. The method of claim 8, wherein the first group of the sensors consists of the given sensor, wherein the given sensor is an inclinometer, and wherein determining the first measure comprises using the known value as the first measure.

10. The method of claim 8, wherein the second group of the sensors comprise a plurality of sensors that include an inertial measurement unit.

11. The method of claim 8, wherein the second group of the sensors comprise a plurality of sensors that include a first sensor measuring an actuator property for a first actuator and a second sensor measuring the actuator property for a second actuator.

12. A method performed by one or more processors of a balancing robot, the method comprising:

determining a first measure of a property of the balancing robot for a first time,
  wherein determining the first measure comprises determining a solution for an unknown variable and using the solution as the first measure,
  wherein determining the solution is based on first sensor data from a first group of sensors of the balancing robot,
  wherein the first group of the sensors includes at least a given sensor of the sensors of the balancing robot, and
  wherein the first sensor data does not directly indicate the solution for the unknown variable;
determining a second measure of the property of the balancing robot for the first time,
  wherein determining the second measure comprises determining an additional solution for the unknown variable and using the additional solution as the second measure;
  wherein determining the additional solution is based on second sensor data from a second group of the sensors of the balancing robot,
  wherein the second group of the sensors excludes the given sensor and includes at least one additional sensor that is not included in the first group, and
  wherein the second sensor data does not directly indicate the additional solution for the unknown variable;
determining a final measure of the property of the balancing robot for the first time based on the first measure and the second measure;
generating one or more control commands based on the final measure of the property; and
providing the one or more control commands to one or more actuators of the balancing robot to control the one or more actuators based on the one or more control commands.

13. The method of claim 12, wherein the first group and the second group each include a plurality of the sensors.

14. The method of claim 12, wherein the sensors of the balancing robot do not include any sensors that directly measure the property of the balancing robot.

15. The method of claim 14, wherein the property of the balancing robot is a force applied by an end effector of the balancing robot.

16. The method of claim 12, wherein determining the solution for the unknown variable comprises determining the solution based on application of the first sensor data to a dynamic model of the balancing robot.

17. The method of claim 12, further comprising:
determining a third measure of the property based on a particular sensor of the sensors that directly measure the property of the balancing robot, wherein the particular sensor is not included in the first group and is not included in the second group;
wherein determining the final measure is further based on the third measure.

18. The method of claim 17, wherein determining the final measure comprises:
using the third measure as the final measure when comparison of the third measure to the first measure and the second measure satisfies one or more criteria.

19. The method of claim 17, wherein determining the final measure comprises determining the final measure based on a statistical combination of the first measure, the second measure, and the third measure.

20. A balancing robot, comprising:
a plurality of actuators;
a plurality of sensors, the sensors omitting any sensor that directly measures a particular property of the balancing robot;
one or more processors receiving sensor data from the sensors, wherein the one or more processors are to:
  determine a first measure of the particular property of the balancing robot for a first time,
    wherein determining the first measure comprises determining a solution for an unknown variable and using the solution as the first measure, and
    wherein determining the solution is based on first sensor data from a first group of the sensors of the balancing robot;
  determine a second measure of the particular property of the balancing robot for the first time,
    wherein determining the second measure comprises determining an additional solution for the unknown variable and using the additional solution as the second measure, and
    wherein determining the additional solution is based on second sensor data from a second group of the sensors of the balancing robot;
  determine a final measure of the property of the balancing robot for the first time based on the first measure and the second measure;
  generate one or more control commands based on the final measure of the property; and
  provide the one or more control commands to one or more of the actuators of the balancing robot to control the one or more of the actuators based on the one or more control commands.

* * * * *